(12) United States Patent
Duez

(10) Patent No.: US 10,117,544 B2
(45) Date of Patent: Nov. 6, 2018

(54) PIE PAN BAKING DEVICE

(71) Applicant: Van Dexter E. Duez, Vista, CA (US)

(72) Inventor: Van Dexter E. Duez, Vista, CA (US)

( * ) Notice: Subject to any disclaimer, the term of this patent is extended or adjusted under 35 U.S.C. 154(b) by 69 days.

(21) Appl. No.: 15/172,373

(22) Filed: Jun. 3, 2016

(65) Prior Publication Data

US 2016/0353922 A1 Dec. 8, 2016

Related U.S. Application Data

(60) Provisional application No. 62/170,807, filed on Jun. 4, 2015.

(51) Int. Cl.
*A21B 3/13* (2006.01)
*A47J 37/01* (2006.01)

(52) U.S. Cl.
CPC .............. *A47J 37/01* (2013.01); *A21B 3/137* (2013.01); *A21B 3/139* (2013.01); *A21B 3/13* (2013.01)

(58) Field of Classification Search
CPC ........... A21B 3/13; A21B 3/137; A21B 3/139; A21B 5/04
USPC ......... 99/426, 432, 433, 428, 442, 439, 447, 99/DIG. 15; 249/123, 141, 160, 155, 249/117, 119, DIG. 1
See application file for complete search history.

(56) References Cited

U.S. PATENT DOCUMENTS

| | | | | |
|---|---|---|---|---|
| 1,531,569 A * | 3/1925 | Rade | ........................ | A21B 3/13 249/102 |
| 2,123,359 A * | 7/1938 | Hallmark | ................. | A21B 3/13 126/391.1 |
| 2,231,223 A * | 2/1941 | Page | ........................ | A21B 3/13 126/376.1 |
| 2,529,354 A * | 11/1950 | Schroeder | ................. | A21B 3/13 220/506 |
| 3,252,683 A * | 5/1966 | Uetzmann | ................. | A21B 3/13 249/160 |
| 3,383,083 A * | 5/1968 | Givens | ...................... | A21B 3/13 249/141 |
| 3,399,858 A * | 9/1968 | Luker | ...................... | A21B 3/13 249/117 |
| 4,395,015 A * | 7/1983 | Reardon | ................... | A21B 3/13 220/506 |
| 5,537,917 A * | 7/1996 | Schiffer | .................... | A21B 3/13 249/DIG. 1 |
| 7,478,588 B2 * | 1/2009 | Miller | ...................... | A47J 37/01 220/506 |

* cited by examiner

*Primary Examiner* — Reginald L Alexander

(74) *Attorney, Agent, or Firm* — David B. Waller

(57) ABSTRACT

The present invention is a pie pan baking device having a pie pan with a plurality of heating vents arranged concentrically forming a ring with fastener apertures located at the same outer corner edge of each of the plurality of the heat vents, a fastener affixed through each fastener aperture, a latch and a cover affixed rotatably to each outer corner edge of the heat vents by the fastener, the cover and latch rotating independently of each other, wherein each cover is able to cover a heating vent, and an inner heating channel having a wall vent for each, wherein the wall vents have a base and ascending inner and outer walls arranged to able to extend through the heating vents, wherein the base is larger than the heating vents and having rectangular cutouts along their outer edges at locations near the latches to allow the latches to secure the base to the pie pan.

15 Claims, 4 Drawing Sheets

A

B

A

B   C

A

B
C

A

B

C

PIE PAN BAKING DEVICE

CROSS-REFERENCE TO RELATED APPLICATIONS

This application is a non-provisional patent application that claims the benefit of provisional patent application Ser. No. 62/170,807 filed 4 Jun. 2015.

FIELD OF THE INVENTION

The present invention relates generally to a device for baking pies. More specifically, the present invention is a pie pan baking device with an inner heating channel that allows for baking a smaller pie within a larger pie. The present invention allows for proper cooking and formation of both pie layers.

BACKGROUND OF THE INVENTION

In baking, it is a fairly common practice to make a pie with layers. Making a pie with vertical layers is reasonably straightforward as the ingredients are simply stacked on top of one another. However, baking pies with horizontal or concentric layers is a much more difficult task. Forming horizontal layers has been proven to be difficult because an individual must attempt to keep the ingredients separated, working against gravity, to layer the pie. Consequently, there is a need in the industry to provide a device that allows users to conveniently layer a pie in the horizontal direction without the need to keep the ingredients separated. This would allow individuals to bake a smaller pie concentrically arranged within a larger pie with ease and allow users to shape and form the crust of the inner pie.

Using traditional methods of baking a pie to bake a pie that is concentrically layered generally results in a deformed looking pie. Unless an individual is well versed in the art of baking, concentrically layered pies are difficult to make without the use of proper tools. Consequently there is also a need to provide a device that allows individuals, without much baking experience, to create an aesthetically pleasing concentrically layered pie.

Further, traditional methods of baking a pie in a regular pie pan are not suitable for baking pies that are concentrically layered. Baking a concentrically layered pie using a regular pie pan leads to the center crust remaining doughy and undercooked. Consequently, there is a need to provide a device that allows for the proper cooking of a concentrically layered pie. The present invention meets these needs utilizing vents arranged onto the inner heating channel for increasing the heat flow and therefore helping to bake the inner pie.

SUMMARY OF THE INVENTION

One aspect of the present invention is a pie pan baking device comprising a pie pan having a plurality of heating vents arranged concentrically forming a ring with the heating vents having an inner edge, an outer edge, two inner corner edges and two outer corner edges with fastener apertures located at the same outer corner edge of each of the plurality of the heat vents, a fastener affixed through each fastener aperture, a latch affixed rotatably to each outer corner edge of each of the heat vents by the fastener, a cover affixed rotatably to each outer corner edge of each of the heat vents with each latch by the fastener, wherein the cover and latch rotate independently of each other and each cover is able to cover a heating vent, and an inner heating channel having a wall vent for each of the heating vents, wherein the wall vents have a base and ascending inner and outer walls arranged similarly to the heating vents and able to extend through the heating vents, wherein the base is larger than the heating vents and have rectangular cutouts along their outer edge at locations near the latches so that the latches can secure the base to the pie pan.

In one embodiment, there are three heating vents and in another embodiment the wall vent is about ⅛ inch to about ½ inch taller than the pie pan.

Another aspect of the present invention is a circular heating channel having a base, ascending inner and outer walls and a top edge along the ascending inner and outer walls, wherein the distance between the walls is from about ⅛ to about ½ inch and the outer diameter of the baking device is from about 3 inches to about 7 inches.

In one embodiment of this aspect of the invention, the ascending outer wall is about ⅛ to about ¾ inches taller than the ascending inner wall. In another embodiment, the ascending outer wall further comprises a means for removing said baking device from said pie pan. In yet another embodiment, the means for removing is one or more apertures along the top edge of the ascending outer and/or inner wall, a lip formed from or added to the top edge of the ascending outer wall, and/or one or more tabs formed from or added to the top edge of the ascending outer wall. In other embodiments, the device further comprises a removable lid that rests on top of the ascending outer wall and/or ascending inner wall and covering the wall vent or, when the ascending outer wall is taller than the ascending inner wall, the removable lid rests on top of the ascending inner wall and fits flush against the ascending outer wall, and the ascending inner wall may further comprises a plurality of apertures with the apertures having a diameter of about 1/16 to about 3/16 in diameter.

Another aspect of the present invention is a pie pan baking device comprising a pie pan and a circular heating channel having a base, ascending inner and outer walls and a top edge along the ascending inner and outer walls, wherein the distance between the ascending inner and outer walls is from about ⅛ to about ½ inch and wherein the ascending outer diameter of the baking device is from about 3 inches to about 7 inches.

In one embodiment, the pie pan further comprises a circular indentation in its base able to receive said circular heating channel. In another embodiment, the circular heating channel is about ⅛ inch to about ½ inch taller than the pie pan. In yet another embodiment, the ascending outer wall is about ⅛ to about ¾ inches taller than the ascending inner wall. In other embodiments, the ascending outer wall further comprises a means for removing the baking device from the pie pan and the means for removing may be one or more apertures along the top edge of the ascending outer wall, a lip formed from or added to the top edge of the ascending outer wall, and/or one or more tabs formed from or added to the top edge of the ascending outer wall. In still another embodiment, the device may further comprise a removable lid that rests on top of the ascending outer wall and/or ascending inner wall and covers the wall vent or, when the ascending outer wall is taller than the ascending inner wall, the removable lid rests on top of the ascending inner wall and fits flush against the ascending outer wall. In another embodiment, the ascending inner wall further comprises a plurality of apertures and the apertures may have a diameter of about 1/16 to about 3/16 in diameter.

DETAIL DESCRIPTIONS OF THE INVENTION

Figure 1:
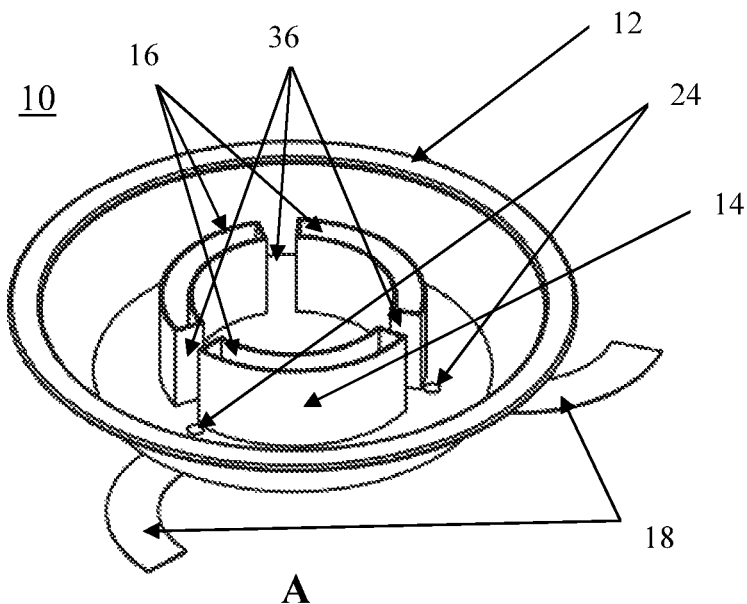
FIG. 1 A) is a perspective view of the present invention and B) shows how the inner heating channel may be inserted into the pie pan.
Figure 1:
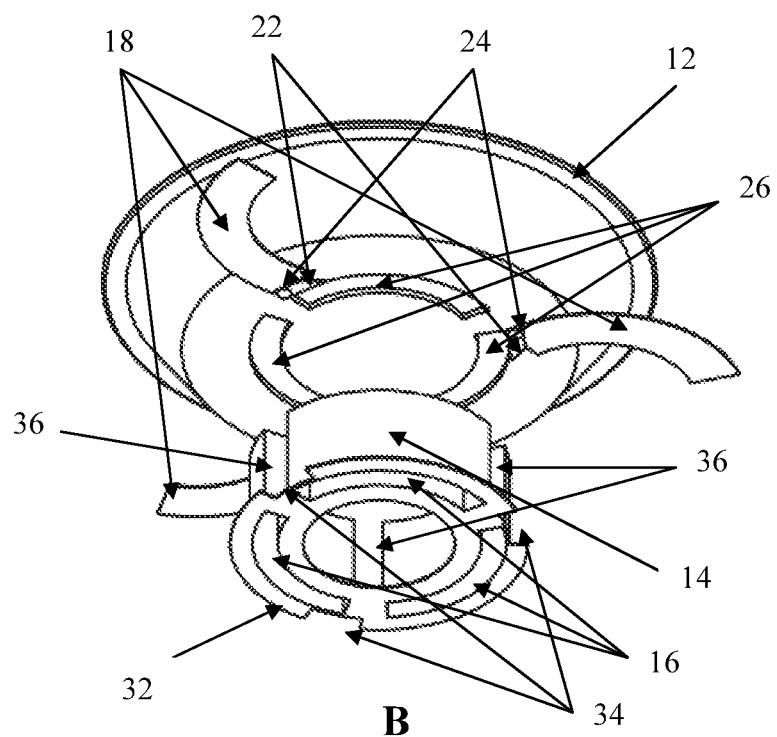

All illustrations of the drawings are for the purpose of describing selected versions of the present invention and are not intended to limit the scope of the present invention.

Unless defined otherwise, all terms used herein have the same meaning as are commonly understood by one of skill in the art to which this invention belongs. All patents, patent applications and publications referred to throughout the disclosure herein are incorporated by reference in their entirety. In the event that there is a plurality of definitions for a term herein, those in this section prevail.

The term "about" as used herein refers to the ranges of specific measurements or magnitudes disclosed. For example, the phrase "about 10" means that the number stated may vary as much as 1%, 3%, 5%, 7%, 10%, 15% or 20%. Therefore, at the variation range of 20% the phrase "about 10" means a range from 8 to 12.

When the terms "one", "a" or "an" are used in the disclosure, they mean "at least one" or "one or more", unless otherwise indicated.

The term "fastener" as used herein refers to any device known to those skilled in the art for affixing one element of the invention to another in the proscribed manner. For example, the phrase "a latch affixed rotatably to each outer corner edge of each heat vent by the fastener" would refer to the use of, for example, a rivet that connects the latch to the pie pan near the heat vent in a way that allows the latch to rotate about the fastener.

The term "cover" as used herein, in reference to the present invention, is a device that covers one end of a heating channel preventing air moving into one open end and exiting the other open end of the heating channel. A cover may also be utilized to create an enclosed space, such as when a cover is placed on top of the two ascending walls on one side of an inner heating channel when the other side is connected by a base.

The phrase "means for removing" refers to methods known to those skilled in the art for removing one element of the invention from another. For example, there are several ways in which the inner heating channel can be configured to be able to be removed easily from a pie pan after cooking. For example, one or more apertures along said top edge of the ascending outer wall may be provided for affixing a handle that may be used to raise the inner heating channel from the pie pan. Alternatively, a lip may be formed from or added to the top edge of the ascending outer wall that may be grasped to remove the inner heating channel from the pie pan or one or more tabs formed from or added to the top edge of ascending outer wall may be utilized for a similar purpose.

One aspect of the present invention is a pie pan baking device comprising a pie pan having a plurality of heating vents arranged concentrically forming a ring with the heating vents having an inner edge, an outer edge, two inner corner edges and two outer corner edges with fastener apertures located at the same outer corner edge of each of the plurality of the heat vents, a fastener affixed through each fastener aperture, a latch affixed rotatably to each outer corner edge of each of the heat vents by the fastener, a cover affixed rotatably to each outer corner edge of each of the heat vents with each latch by the fastener, wherein the cover and latch rotate independently of each other and each cover is able to cover a heating vent, and an inner heating channel having a wall vent for each of the heating vents, wherein the wall vents have a base and ascending inner and outer walls arranged similarly to the heating vents and able to extend through the heating vents, wherein the base is larger than the heating vents and have rectangular cutouts along their outer edge at locations near the latches so that the latches can secure the base to the pie pan. Other aspects of the present invention are a circular heating channel having a base, ascending inner and outer walls and a top edge along the ascending inner and outer walls, wherein the distance between the walls is from about 1/8 to about 1/2 inch and the outer diameter of the baking device is from about 3 inches to about 7 inches and the circular heating channel with a pie pan.

The present invention will allow individuals to conveniently bake a concentrically layered pie. A customized pie pan and inner heating channel will allow users to bake a smaller pie within a larger pie. The end product is a pie with an inner pie concentrically arranged to the center. To use the device 10, the user will insert the inner heating channel 14 through the bottom of the pie pan 12 and lock it into place using the latches 22 (the covers 18 will remain opened). Two separate crusts will be laid down, one for the outer layer of pie and one for the inner pie. The user can then simply fill the pie pan 12 with their desired ingredients. The inner heating channel 14 will keep the ingredients separated and allow for the inner crust to heat properly through the heat vents 26. Once the pie has been fully baked, the user will unlock the inner heating channel 14 and remove it through the bottom of the pie pan 12. Once removed, the user will use the covers 18 to close the heat vents 16 on the pie pan 12. The user has now created a concentrically layered pie. The empty space between the outer and inner pie formerly filled by the wall can be filled with additional ingredients or simply left alone.

Figure 2:
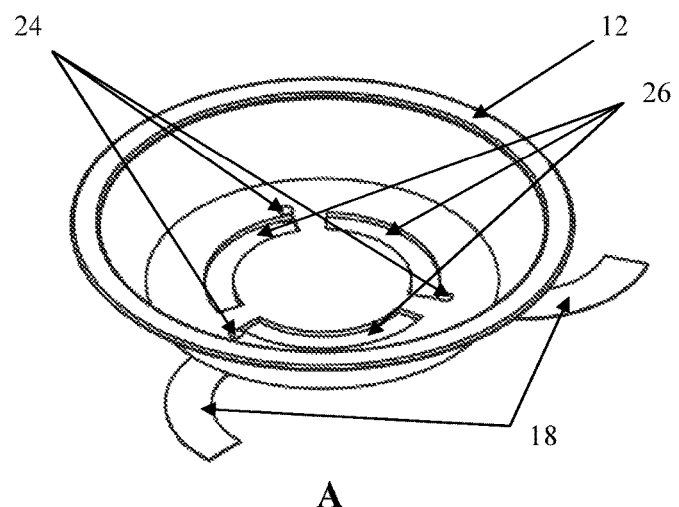
FIG. 2 A) is a perspective view of the pie pan with the heat vents open, B) is a top plan view of the pie pan with the heat vents open and C) is a bottom plan view of the pie pan with the heat vents open and the inner heating channel in secured in place.
Figure 2:
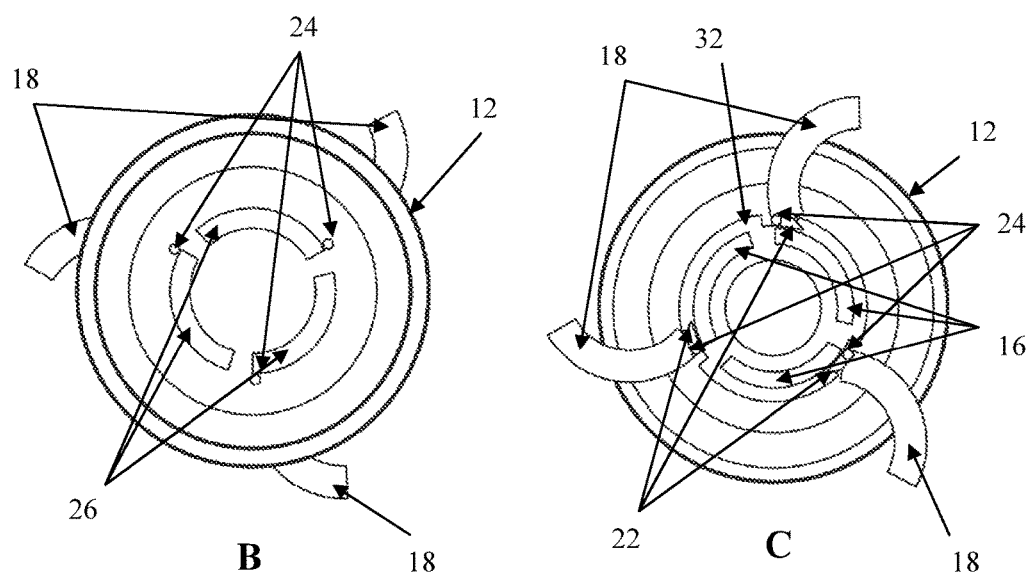

The present invention comprises two main components of a pie pan 12 and inner heating channel 14. The pie pan 12 is the base of the invention where both the inner and outer pies will bake. The pie pan 12 further comprises a plurality of heat vents 26, fastener holes, fasteners 28, latches 22 and covers 18. As depicted in FIGS. 1A and 2A-C, the heat vents 26 are arranged to the bottom surface of the pie pan 12. The heat vents 26 may be partial ring cutouts arranged concentrically onto the bottom of the pie pan 12. Alternatively, the heating vents 26 may be provided in any configuration that will allow the inner heating channel 14 to be inserted through the pie pan 12 and is generally in the same configuration as the inner heating channel 14. In one example, the heat vents 26 are formed by three partial ring cutouts that essentially form a ring. The fastener holes are circular cutouts that will allow for the attachment of the fasteners 28, latches 22 and covers 18. The fastener holes are arranged toward the outer corner edge of the heat vents 26, as depicted in FIG. 2B. The fasteners 28 will be concentrically arranged into the fastener holes. Although depicted in the figures, the fastener 28 is not limited to such design and may be replaced with any typical fastener such as a bolt, screw, etc. The covers 18 are thin components in the same shape as the heat vents 26, as depicted in FIG. 2C. The covers 18 must be larger than the heat vents 26. Meaning, the size and shape of the cover 18 must be sufficiently large enough to cover 18 and close off the entire heat vent 26. The covers 18 further comprise a fastening hole. The fastening hole is arranged to the outer corner of the covers 18, as depicted in FIGS. 1B and 2C. The covers 18 will be arranged so that they swivel about the fastener holes located on the pie pan 12, as depicted in FIG. 2C. The user will be able to close off the heat vents 26 using the covers 18. FIGS. 2A-C depicts the pie pan 12 with the heat vents open 26. The latches 22 shown in this embodiment are small thin components that similarly swivel about the fastener holes located on the pie pan 12. The latches 22 are in the shape of a rectangle trapezoid, as depicted in FIG. 2C. However, they may be provided in any shape that allows them the securely lock the inner heating channel 14 in place when inserted through the pie pan 12. The latches 22 further comprise a fastening hole for attaching to the pie pan 12. The fastening hole is arranged toward the rectangular end of the latch 22. The latches 22 are arranged over the covers 18 and attach to the same fastener holding the covers 18 in place. The latches 22 hold the inner heating channel 14 in place once inserted into the pie pan 12. The latches 22 and covers 18 are able to independently and freely rotate about the fastener holes. Meaning, rotating the cover 18 does not necessarily rotate the latch 22 and vice versa.

Figure 3:
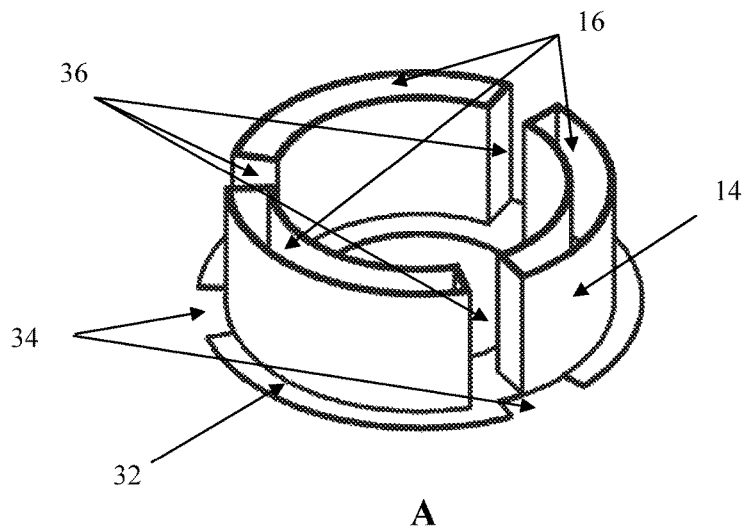
FIG. 3 A) is a perspective view of the inner heating channel, B) is a top plan view of the inner heating channel and C) is a bottom plan view of the inner heating channel.
Figure 3:
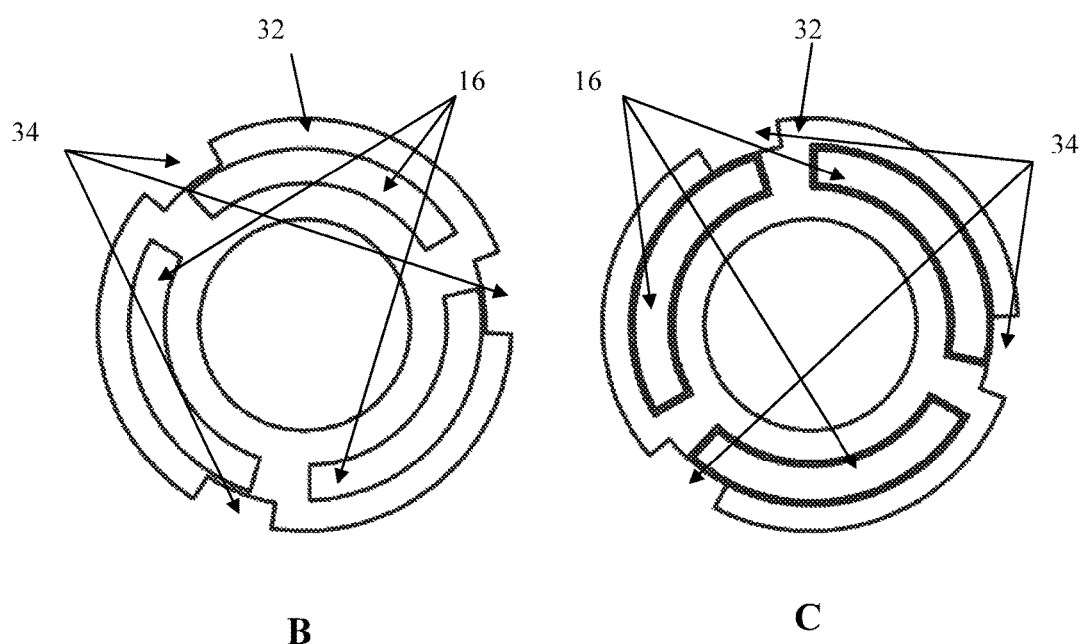

The inner heating channel 14 is the section where the inner pie will bake. The inner heating channel 14 further comprises walls and a latch catch and or base 32 that extends beyond the walls forming a lip that may be used to secure the inner heating channel 14 in place. In one embodiment the latch catch 32 is a thin, disc like component that further comprises cutouts and a center opening. As depicted in FIGS. 3B and 3C, a circular cutout is arranged concentrically to the center of the latch catch 32, also known as the center opening. The center opening increases the heat transfer as less material is between the heat source and the base of the pie. Depicted in the same figures are rectangular cutouts arranged onto the outer edge of the latch catch 32. The arrangement of these cutouts will correspond with the location of the fastener holes on the pie pan 12. The cutouts prevent any interference between the latch catch 32 and attachment point for the covers 18 and latches 22. The cutout essentially allows the inner heating channel 14 to be placed flush with the bottom of the pie pan 12 without blocking the latches 22. FIG. 3 depicts one configuration and shows how the latches 22 will lock the inner heat channel 14 in place via the latch catch 32. The walls are arranged onto the top surface of the latch catch 32 and line up with the cutouts, as depicted in FIG. 3B. The walls further comprise wall vents 16 and insert slots. The size and shape of the walls correspond to the heat vents 26 located on the pie pan 12. In one embodiment, the walls are in the shape of partial ring cutouts, similar to the heat vents 26 as depicted in FIG. 3A. There are two walls separated by a space of between ⅛ and ½ inch and comprise openings on the top and bottom surfaces. The cavity within the wall is known as the wall vent 16 and extends through the latch catch 32. These vents 16 provide heat for baking the inner pie and crust. Without the vents 16, the inner pie crust may likely remain undercooked and doughy. To further assist in baking the crust, apertures of a diameter from 1/16 to ¼ inch may be provided on the inner of the two walls of the inner heating channel 14. The insert slots 36 describe the cutouts from the wall. The insert slots 36 make it possible for the inner heating channel 14 to be inserted into the pie pan 12. As depicted in FIG. 1B, the inner heating channel 14 will be inserted through the heat vents 26 on the bottom of the pie pan 12. Although the inner heating channel 14 is depicted as a straight cylindrically shaped component, it may be angled outward to resemble the shape of a pie pan 12. This will involve slightly altering the shape of the heat vents 26 on the pie pan 12 so that the inner heating channel 14 can be inserted without any interference.

Figure 4:
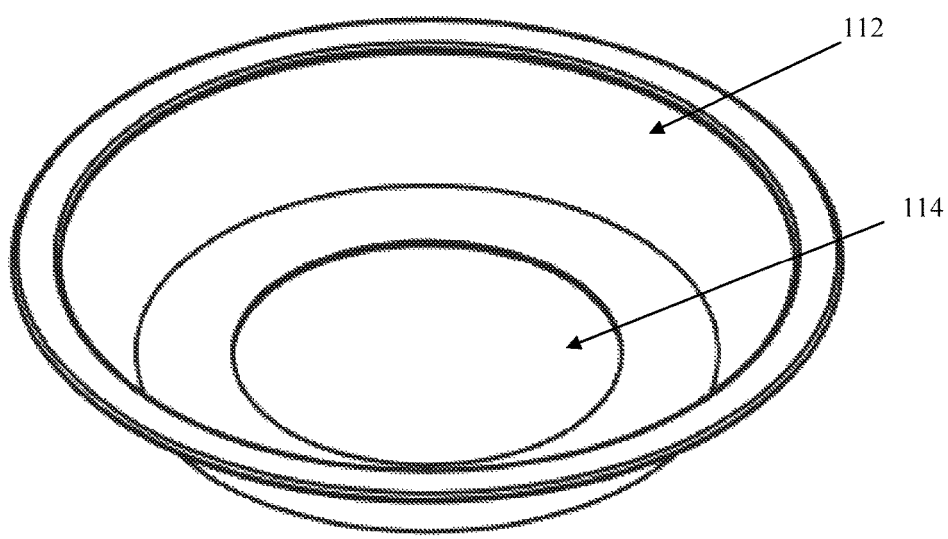
FIG. 4 A) is a perspective view of the basic pie pan, B) is a perspective view of the basic inner heating channel and C) is an exploded view of the basic pie pan device showing the lip being inserted into the inner heating channel.
Figure 4:
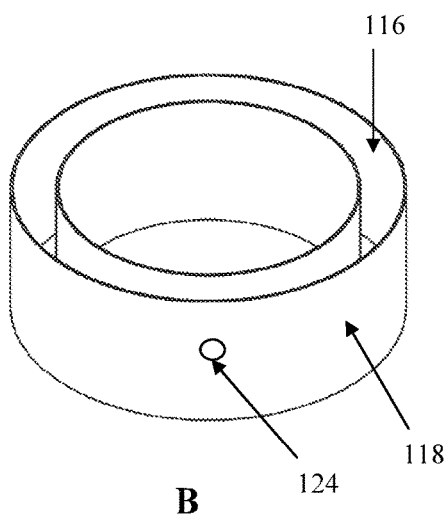
Figure 4:
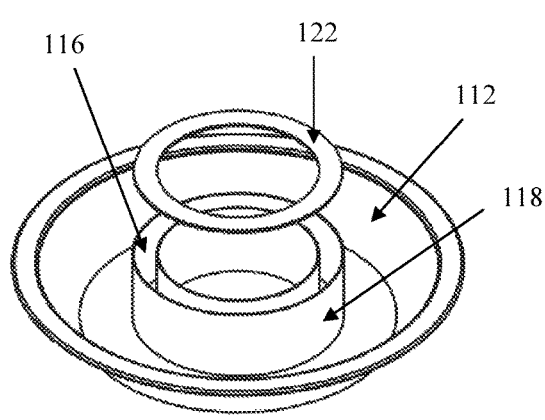

In another aspect of the present invention, device 20 the inner heating channel 118 and pie pan 112 may have a simpler design. This configuration is depicted in FIGS. 4A-B. This aspect comprises the same two main components of a pie pan 112 and inner heating channel 118. However, each component is simplified a great amount. The pie pan 112 in this configuration comprises an indentation 114 to accept the inner heating channel 118. As depicted in FIG. 4A, a circular indentation 114 is concentrically arranged onto the top surface of the base of the pie pan 112. This indentation 114 will assist in the placement of the inner heating channel 118 within the pie pan 112. The inner heating channel 118 further comprises a removing means such as an aperture 124 for grasping the inner heating channel and a removable lip 122. The inner heating channel 118 is a hollow ring like component with an opening arranged to the top surface, as depicted in FIG. 4B. The removable lip 122 is a disc like component with a circular cutout concentrically arranged to its center. The removable lip 122 will allow the user to form and mold the crust. FIG. 4C depicts how the lip 122 will be placed within the inner heating channel 118. The inner heating channel 118 will be placed into the indentation 114 located on the pie pan 112. Rather than pulling the inner heating channel 118 through the bottom of the pie pan 112, the inner heating channel 118 is pulled from the top once the pies are cooked. Although much simpler to use, this embodiment of the present invention has some fallbacks, such as a less effective heat venting system. This is because the inner heating channel 118 wall vents 116 do not extend through the bottom of the pie pan 112, therefore the heat cannot enter through the bottom of the inner heating channel 118 and only through the top. However, this design provides sufficient heat to efficiently cook the pie crust and or pie crust with filling. It is understood that this version of the inner heating channel 118 may be used in a regular pie pan. However, when using a regular pie pan, the inner heating channel 118 will not be secured to the center of the pie pan as there will be no indentation to hold it in place. This allows for the creative placement of the inner heating channel within the pie pan. In either configuration, device 10 or 20, the pie pan and the inner heating channel may be made of a material that transmits heat efficiency, (e.g., aluminum or stainless steel). Further, the elements in any configuration may be made of the same or different materials.

In other embodiments the ascending outer wall of the inner heating channel may comprise fanciful cutouts that might be pleasing to adults and/or children. For example, they may be cutouts of line drawings of fruits that may be used to make pies, or line drawing cutouts of items associated with holidays (i.e., Christmas, birthdays, Valentine's Day etc.) during which pies might be made. In fact, any line drawing cut out that one skilled in the art might consider could be utilized as an aesthetic element of the present invention.

Although the invention has been explained in relation to its preferred embodiment, it is to be understood that many other possible modifications and variations can be made without departing from the spirit and scope of the invention.

The invention claimed is:

1. A pie pan baking device comprising:
    a. a pie pan having a plurality of heating vents arranged concentrically forming a ring said heating vents having an inner edge, an outer edge, two inner corner edges and two outer corner edges with fastener apertures located at the same outer corner edge of each of the plurality of the heat vents;
    b. a fastener affixed through each fastener aperture;
    c. a latch affixed rotatably to each outer corner edge of each of the plurality of the heat vents by the fastener;
    d. a cover affixed rotatably to each outer corner edge of each of the plurality of the heat vents with each latch by the fastener, said cover and latch rotating independently of each other wherein said cover able to cover a heating vent; and
    e. an inner heating channel having a wall vent for each of said heating vents, said wall vents having a base and ascending inner and outer walls arranged similarly to said heating vents and able to extend through said heating vents, said base being larger than said heating vents and having rectangular cutouts along its outer edge at locations near said latches wherein said latches can secure said base to said pie pan.

2. The pie pan baking device of claim 1, wherein said plurality of heating vents are three heating vents.

3. The pie pan baking device of claim 1, wherein the wall vent is about ⅛ inch to about ½ inch taller than the pie pan.

4. A baking device for a pie pan comprising:
    a circular heating channel having a base, ascending inner and outer walls and a top edge along said ascending inner and outer walls, wherein the distance between said ascending inner and outer walls is from about ⅛ to about ½ inch and wherein the ascending outer wall diameter of said baking device is from about 3 inches to about 7 inches, wherein the ascending outer wall further comprises a means for removing said baking device from said pie pan and wherein said means for removing is one or more apertures along said top edge of said ascending outer wall, a lip formed from or added to the said top edge of said ascending outer wall, and/or one or more tabs formed from or added to the said top edge of said ascending outer wall.

5. A baking device for a pie pan comprising:
    a circular heating channel having a base, ascending inner and outer walls and a top edge along said ascending inner and outer walls, wherein the distance between said ascending inner and outer walls is from about ⅛ to about ½ inch and wherein the ascending outer wall diameter of said baking device is from about 3 inches to about 7 inches, further comprising a removable lid that rests on top of said ascending outer wall and/or ascending inner wall and covering the wall vent or when said ascending outer wall is taller than said ascending inner wall, said removable lid rests on top of said ascending inner wall and fits flush against said ascending outer wall.

6. A pie pan baking device comprising:
    a pie pan; and
    a circular heating channel having a base, ascending inner and outer walls and a top edge along said ascending inner and outer walls, wherein the distance between said ascending inner and outer walls is from about ⅛ to about ½ inch and wherein the ascending outer diameter of said baking device is from about 3 inches to about 7 inches, wherein said ascending outer wall comprises a means for removing said baking device from said pie pan; and wherein said means for removing is one or more apertures along said top edge of said ascending outer wall, a lip formed from or added to said top edge of said ascending outer wall, and/or one or more tabs formed from or added to said top edge of said ascending outer wall.

7. The pie pan baking device according to claim 6, wherein said ascending inner wall further comprises a plurality of apertures.

8. The pie pan baking device according to claim 7, wherein said plurality of apertures have a diameter of about 1/16 to about 3/16 in diameter.

9. The pie pan baking device according to claim 6, wherein said pie pan further comprises a circular indentation in its base able to receive said circular heating channel.

10. The pie pan baking device of claim 6, wherein the circular heating channel is about ⅛ inch to about ½ inch taller than the pie pan.

11. The pie pan baking device according to claim 6, wherein the ascending outer wall is about ⅛ to about ¾ inches taller than said ascending inner wall.

12. A pie pan baking device comprising:
    a pie pan;
    a circular heating channel having a base, ascending inner and outer walls and a top edge along said ascending inner and outer walls, wherein the distance between said ascending inner and outer walls is from about ⅛ to about ½ inch and wherein the ascending outer diameter of said baking device is from about 3 inches to about 7 inches; and
    a removable lid that rests on top of said ascending outer wall and/or ascending inner wall and covering the wall vent or when said ascending outer wall is taller than said ascending inner wall, said removable lid rests on top of said ascending inner wall and fits flush against said ascending outer wall.

13. The pie pan baking device according to claim 12, wherein said pie pan further comprises a circular indentation in its base able to receive said circular heating channel.

14. The pie pan baking device of claim 12, wherein the circular heating channel is about ⅛ inch to about ½ inch taller than the pie pan.

15. The pie pan baking device according to claim 12, wherein the ascending outer wall is about ⅛ to about ¾ inches taller than said ascending inner wall.

* * * * *